H. C. BRUNKER.
NUT LOCK.
APPLICATION FILED MAR. 27, 1909.

929,548.

Patented July 27, 1909.

Witnesses,
Robt Pruitt

Inventor:
Harry C. Brunker,
By James L. Norris
Atty.

HARRY C. BRUNKER, OF MIDDLEPORT, OHIO.

NUT-LOCK.

No. 929,548.      Specification of Letters Patent.      Patented July 27, 1909.

Application filed March 27, 1909. Serial No. 486,140.

*To all whom it may concern:*

Be it known that I, HARRY C. BRUNKER, a citizen of the United States, residing at Middleport, in the county of Meigs and State of Ohio, have invented new and useful Improvements in Nut-Locks, of which the following is a specification.

This invention relates to new and useful improvements in nut locks and more particularly to a nut lock of that type which embodies substantially a pawl locking device.

In connection with a structure of the above general type the invention aims as a primary object to provide a nut locking device whereby the nut is positively locked in such a manner that it may be removed or permanently retained and non-removable, at the option of the user. In the first case, the fastening will be a simple nut and bolt fastening in which the nut is locked against accidental displacement, but in the second case the fastening will have an analogy to a rivet, in that the nut is locked in such manner that its removal from the bolt is not possible.

The invention also aims to provide a nut locking device which may be used either to lock a single nut against the part held or to lock a pair of adjacent nuts together and non-rotatably upon the bolt.

Toward the ends of carrying out the above objects, the invention may be described more particularly as comprising a nut locking device in the nature of a washer which is made in sections, each section having a spring tongue struck out therefrom. The arrangement is such that when the nut is turned against one of the sections, it is positively held and the spring tongue may be manipulated to permit of its removal from the bolt; but when the nut is turned against the other section it is also positively held and the spring tongue may not be manipulated to permit of its removal from the bolt. The device may be utilized as above stated in connection with a pair of adjacent nuts, in which arrangement the tongue on one section will hold one nut and the tongue on the other section will hold the other nut. The device is also capable of use as an ordinary washer and in such use will have an efficient locking action by reason of the friction between its spring tongues and the adjacent surfaces.

In the accompanying drawings I have illustrated a preferred and advantageous embodiment of the invention, the structural details of which will be set forth at length in the following description while the novel features by which the invention is distinguished from the prior art will be recited in the claims appended at the end of the description.

Figure 1:
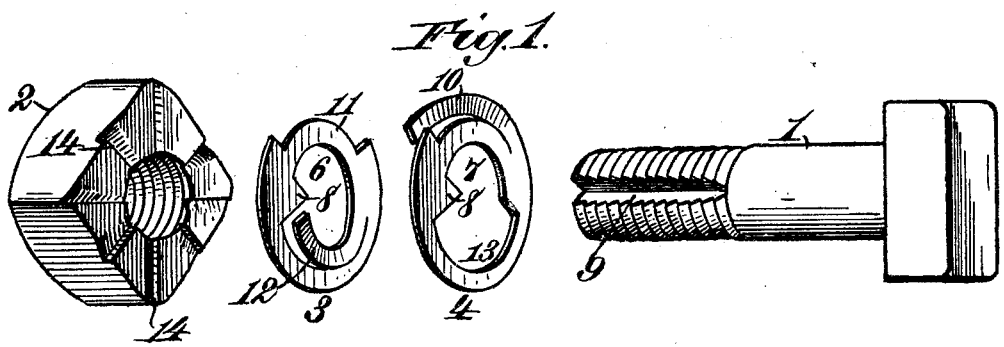
Figure 2:
Figure 3:
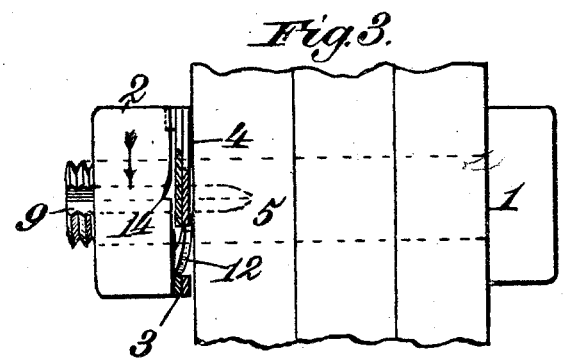
Figure 5:
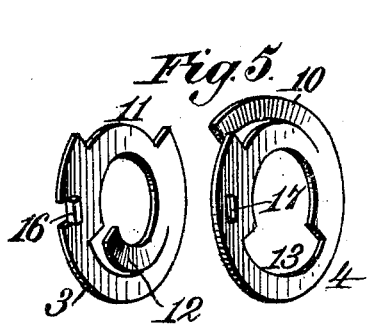
Figure 4:
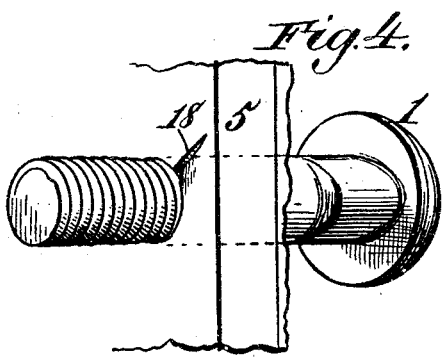
Figure 6:
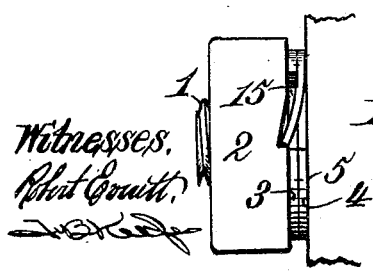

In the said drawings: Figure 1 is a perspective view showing in detached relation but in the natural order of their assemblage, all the elements and adjuncts of the present invention, the said figure disclosing the nut, the bolt and the intermediate sections of the locking washer. Fig. 2 is a detail perspective view of the locking washer with its sections assembled. Fig. 3 is an elevation partly in section showing the manner of using the device to prevent the removal of the nut. Fig. 4 is a perspective view of a bolt without the central groove which is shown in the bolt in Fig. 1. Fig. 5 is a perspective view illustrating in detached relation the sections of a slightly modified form of the washer for use in connection with the bolt shown in Fig. 4. Fig. 6 is an elevation showing the manner of using the device to permit of the removal of the nut.

Similar characters of reference refer to corresponding parts throughout the several views.

Referring more particularly to Fig. 1, the numeral 1 designates the bolt, the numeral 2 the nut, and the numerals 3 and 4 the sections of the locking washer. In Figs. 3 and 4, the numeral 5 designates one of the parts to be clamped and against which the washer bears.

The washer sections 3 and 4 may be of substantially annular form, as disclosed in Fig. 1, or they may be of a shape corresponding to that of the nut, for the purpose of a neat appearance. The illustration of the sections as so formed, is deemed unnecessary, the variation being merely in shape and not in structure. The spring tongue on the section 4 is employed to lock the nut 2 when it is desired to provide for the removal of said nut and the spring tongue on the section 3 is employed to lock the nut when it is desired to provide against removal of the same. The sections 3 and 4 are of substantially annular form, having central openings 6 and 7, and in the embodiment shown in Fig. 1, are each provided with a V-shaped finger, as 8, which projects within the confines of the openings 6 and 7 and, when the washer is assembled, engages in a longitudinal groove, as 9, which is formed in the threaded portion of the bolt 1 and is of V-shaped cross section. By virtue of this arrangement the washer is held against rotation on the bolt. The section 4 has a curved spring tongue, as 10, which is struck out from its edge portion and which projects through a cut-away recess, as 11, which is formed in the edge of the section 3. The section 3 is constructed with a curved spring tongue, as 12, which is struck out from the edge portion of the opening 6 and which projects through an extension, as 13, of the opening 7 in the section 4. The tongues 10 and 12 extend in relatively opposite directions, as best shown in Fig. 2. In using the device as a positive lock, the nut 2 is provided on its rear face with a series of radially extending ratchet teeth, as 14, which are engaged by either of the tongues 10 or 12, as the case may be, in accordance with whether the nut is assembled for subsequent removal or is non-removably assembled. In the use of the device to permit of the removal of the nut 2, said nut is turned against the section 3 and is engaged by the tongue 10 in the manner shown in Fig. 6, the tongue 12 which projects at the opposite side of the washer bearing against the surface of the part 5. In using the device so as to prevent the removal of the nut, the said nut is turned against the section 4 and the teeth 14 are engaged by the tongue 12 of the section 3, the tongue 10 which projects at the opposite side of the washer engaging the surface of the adjacent part 5, as shown in Fig. 3. When the tongue 10 engages the teeth 14 in the manner shown in Fig. 6, a space, as 15, is provided for the insertion of an instrument between the nut 2 and the section 4, such instrument being inserted into the recess 11 and being employed to pry the tongue 10 out of engagement with the teeth 14, at which time the nut may be removed. When the tongue 12 is used, however, to engage the teeth 14, no space is provided wherein any instrument to pry the tongue 12 away from said teeth may be inserted and, therefore, the lock is of a permanent nature and the resultant fastening is in the nature of a rivet fastening. In the use of the form shown in Fig. 1, a bolt having a round shank is employed. As such a bolt may be rotated by means of an instrument engaged upon its head, it is necessary to provide the fingers 8 in order that, in case an attempt is made to remove the nut by turning the bolt, the nut will rotate with the bolt and consequently such an attempt will fail. In Fig. 4, the bolt has a shank which is square in cross section and consequently said bolt may not be turned. It is, therefore, not necessary to provide the fingers 8. In using the device upon such a bolt, the sections 3 and 4 are positively locked together, in order that there may be no relative rotation thereof and accordingly a projection, as 16, is struck inwardly from the edge of the section 3 for engagement in an opening, as 17, which is formed in the section 4 and it is preferred to cut a radially extending ratchet tooth, as 18, upon the part 5, which tooth will be engaged by either the tongues 10 or 12, as the case may be, in accordance with the manner in which the device is used. In this manner the washer sections are positively locked to one another, the washer as an entirety is locked to the part 5, and the nut is locked to the washer and therefore may not be turned. At the same time, the removal of the nut by turning the bolt can not be effected because the bolt, owing to the square shape of its shank, may not be turned.

As was stated above, the device may be used as a simple washer in connection with a nut having a flat rear face and with a part 5 having a flat bearing surface, in which case the frictional bearing of the tongues 10 and 12 will efficiently provide against accidental displacement of the nut. The device may be also used advantageously in connection with a pair of nuts, the teeth of one of which will be engaged by the tongue 10 and the teeth of the other of which will be engaged by the tongue 12 and in such use will lock the nuts firmly upon the bolt.

Having fully described my invention, I claim:

1. A nut lock comprising a washer which consists of two abutting sections having central registering openings, each section having a spring tongue struck out therefrom, the tongues projecting in opposite directions and at opposite sides of the washer, one of said tongues being nearer the center of the washer than the other and both being formed to engage the base of the nut.

2. A nut lock comprising a washer which consists of two abutting sections having central registering openings, one of the sections having a spring tongue struck out from its edge and an extension of its central opening, the other section having a cutaway edge portion through which the tongue projects and having also a spring tongue struck out from the edge of its central opening and which in turn projects through the extension of the central opening of the first named section.

3. A nut lock comprising a washer having one side thereof characterized only by a tooth projecting therefrom at the peripheral edge portion of the washer and having its opposite side characterized only by a tooth projecting therefrom inwardly of the peripheral edge portion of the washer, the peripheral tooth being accessible and providing for a removable association of the nut and the part upon which it is held and the inwardly located tooth being inaccessible and providing for a permanent association of the nut and the part upon which it is held, one of the teeth being out of engagement with the nut when the other is in engagement therewith and the engagement of either of the teeth with the nut being optional.

In testimony whereof I have hereunto set my hand in presence of two subscribing witnesses.

HARRY C. BRUNKER.

Witnesses:
　ALFRED C. MASON,
　NEWTON VAN WILSON.